United States Patent
Badea et al.

(10) Patent No.: US 9,483,373 B2
(45) Date of Patent: Nov. 1, 2016

(54) DEBUG CONFIGURATION TOOL WITH LAYERED GRAPHICAL USER INTERFACE

(71) Applicants: Dragos Adrian Badea, Bucharest (RO); Petru Lauric, Medford, MA (US)

(72) Inventors: Dragos Adrian Badea, Bucharest (RO); Petru Lauric, Medford, MA (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 290 days.

(21) Appl. No.: 14/253,427

(22) Filed: Apr. 15, 2014

(65) Prior Publication Data

US 2015/0234582 A1    Aug. 20, 2015

(30) Foreign Application Priority Data

Feb. 14, 2014 (RO) .................................. 2014 00118

(51) Int. Cl.
G06F 11/26 (2006.01)
G06F 11/36 (2006.01)

(52) U.S. Cl.
CPC .......... *G06F 11/26* (2013.01); *G06F 11/3664* (2013.01)

(58) Field of Classification Search
USPC .................................................... 714/46, 733
See application file for complete search history.

(56) References Cited

U.S. PATENT DOCUMENTS

| | | | |
|---|---|---|---|
| 6,167,561 A * | 12/2000 | Chen | G06F 17/5031 703/23 |
| 6,732,311 B1 * | 5/2004 | Fischer | G06F 11/27 712/227 |
| 6,834,301 B1 | 12/2004 | Hanchett | |
| 6,839,869 B2 * | 1/2005 | Doi | G06F 11/3636 714/39 |
| 6,895,530 B2 * | 5/2005 | Moyer | G06F 11/3664 714/25 |
| 6,925,583 B1 * | 8/2005 | Khu | G01R 31/31854 714/30 |
| 6,973,591 B2 * | 12/2005 | Debling | G06F 11/261 703/28 |
| 6,973,592 B2 * | 12/2005 | Debling | G06F 11/3656 703/23 |
| 7,506,205 B2 * | 3/2009 | Pedersen | G06F 11/2236 714/30 |
| 7,657,873 B2 | 2/2010 | Horton et al. | |
| 7,752,016 B2 * | 7/2010 | Johnson | G06F 11/349 702/186 |
| 7,783,866 B2 * | 8/2010 | Chen | G06F 11/3466 712/227 |
| 7,809,991 B2 * | 10/2010 | Johnson | G06F 11/348 714/45 |
| 8,112,683 B1 * | 2/2012 | Wiesner | G01R 31/31705 714/727 |
| 2003/0217353 A1 | 11/2003 | Bebout et al. | |
| 2005/0246690 A1 * | 11/2005 | Horton | G06F 11/3664 717/125 |
| 2005/0273490 A1 | 12/2005 | Shrivastava et al. | |
| 2009/0063991 A1 * | 3/2009 | Baron | H04L 12/1822 715/751 |
| 2010/0169867 A1 | 7/2010 | Wegmann | |
| 2011/0161760 A1 * | 6/2011 | Bansal | G06F 11/3656 714/733 |
| 2012/0192160 A1 | 7/2012 | Pett | |

* cited by examiner

*Primary Examiner* — Kamini Patel

(57) ABSTRACT

A debug configuration tool for configuration of on-chip debug features comprises a database comprising predefined analysis points, each relating to a configurable chip entity, and comprising a configurable condition and a configurable action for the chip entity, a plurality of predefined analysis groups, each relating to a group of configurable chip entities, and comprising a configurable condition and a configurable action for the group of chip entities. The tool comprises a graphical user interface module arranged to display representations of at least some of the analysis points and the analysis groups on different levels of detail, and to receive input from a user to set the configurable conditions and/or actions for the displayed analysis points and the analysis groups. An application program interface module processes data received from the graphical user interface module to obtain debug settings and to communicate the debug settings to a debug target system configuration module.

18 Claims, 10 Drawing Sheets

DEBUG CONFIGURATION TOOL WITH LAYERED GRAPHICAL USER INTERFACE

CROSS REFERENCE TO RELATED APPLICATIONS

The present application is claims priority to Romanian Patent Application No. 2014 00118, filed Feb. 14, 2014, entitled "DEBUG CONFIGUREATION TOOL WITH LAYERED GRAPHICAL USER INTERFACE," the entirely of which is herein incorporated by reference.

FIELD OF THE INVENTION

This invention relates to a debug configuration tool for configuration of on-chip debug features and to a method for configuration of on-chip debug features.

BACKGROUND OF THE INVENTION

Today's complex systems on chip (SoC) encompass hardware acceleration blocks, many cores, and buses. Functionality issues and performance problems in such complex systems are not easy to analyse. One of the difficulties is the configuration of the on-chip debug features on these systems. As an example, there are more than 250 debug configuration registers associated with the Data Path Acceleration Architecture (DPAA) block of the so-called QorIQ processors.

Users are focused to learn about system and modules functionality and do not have the time budget to also dig into the details of the on-chip debug hardware. Instead they require a way to easily configure the debug features to obtain visibility into the performance and the behaviour of sub-systems such as cores, hardware acceleration blocks, bus, memory and interconnections.

The engineers working with complex SoCs do not have facile means to describe a debug configuration, which, in such systems, could include hundreds of registers, in order to obtain visibility into the system's activity. Engineering teams are mostly specialized in one or more subsystems. However when debugging, they cannot ignore the interaction with other blocks in the system. They might need more details of the subsystems for which they are experts in, while for the other subsystems, they might need only a high level perspective.

Known methods to configure debug IP modules have not addressed well the above problems. Most of the tools are only targeting the software debug (i.e. processing cores only) and configuration APIs are usually just exposing the debug registers, so the user would need to be knowledgeable of the debug IP modules. Some debug configurations can be described in XML files but such methods proved very error prone (e.g. in CodeWarrior, user would need to modify a 9000 line file to define a DPAA debug configuration).

Most of the known debugging tools provide a graphical user interface (GUI) for interaction with a user. The known GUIs are used to simply expose the debug register contents.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
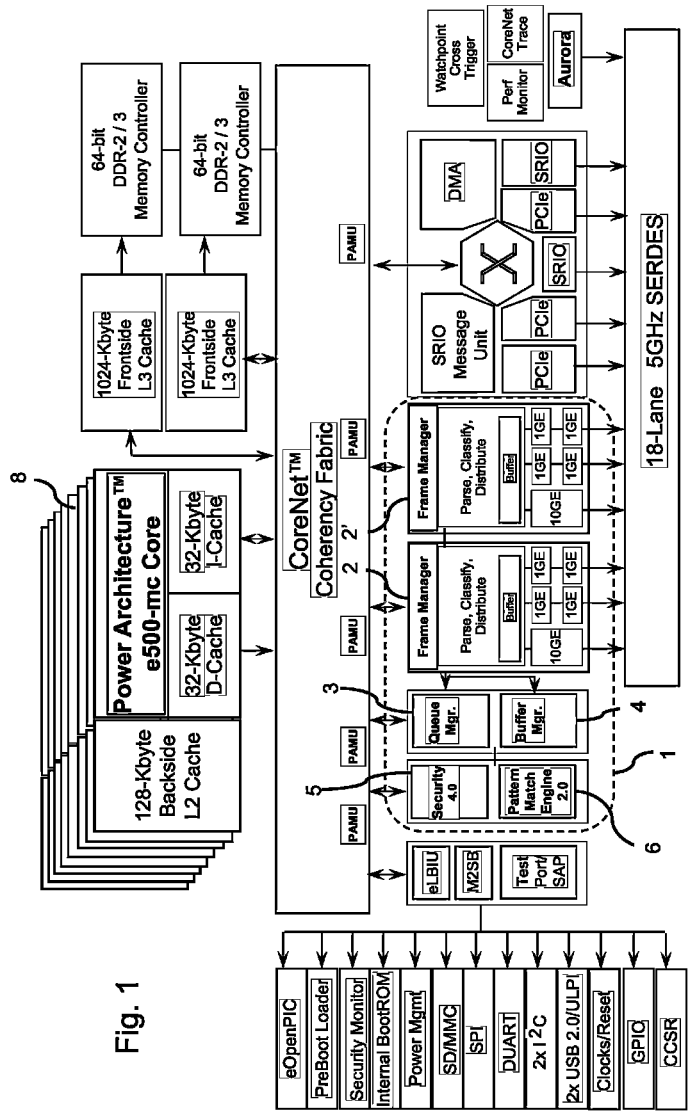
FIG. 1 shows scheme of the state of the art QorIQ chip.

FIG. 1 shows scheme of the state of the art QorIQ chip. Amongst other modules, the QorIQ chip comprises a Data Path Acceleration Architecture (DPAA) module, see dashed rounded square in FIG. 1 also referred to as DPAA module 1. The DPAA module 1 provides the infrastructure to support simplified sharing of networking interfaces and accelerators by multiple CPU cores. These resources are abstracted into enqueue/dequeue operations by means of a common DPAA Queue Manager driver. The DPAA module 1 comprises two Frame managers 2, 2'. Furthermore the DPAA module 100 comprises a Queue manager 3, a Buffer manager 4, a security manager 5 and a pattern match engine 6. Both the security manager 5 and the pattern match engine 6 are so-called accelerators. The functioning of the QorIQ chip will not be explained here since it is known by the skilled person. Only those aspects relevant for the debugging of the DPAA module will be discussed.

The different components of the DPAA module may comprise debug IP registers (not shown in FIG. 1) from which data can be read and in which data can be written by a debugger (configuration) tool. The debugger tool may be running on a computer which is connected to the QorIQ chip via a debug adapter (such as a state of the art JTAG (Joint Test Action Group) module.

Current debugger tools are mainly used to debug the software running on cores. A configuration component of a traditional GUI debugger tool plots e.g. a circle in the source code editor near the line where the user intends to stop the program execution. There is a need for a more advanced GUI interface which is useful in debugger tools not only for systems with cores but also for more complex systems with accelerators and multiple cores, and also buses and memory blocks (provided these have debug features).

According to an aspect a debug configuration tool is provided for configuration of on-chip debug features. The debug configuration tool uses so-called analysis points that are associated with configurable chip entities such as a processing unit (CPU, core), a memory block, a bus, a Frame manager or a Queue manager of the DPAA module 1 of the QorIQ chip. A special GUI is provided which may be used to configure any type of SoC functional block that implements debug features.

The GUI is arranged to display representations of the analysis points. The analysis points may be grouped into so-called analysis groups. A user interacting with the GUI will look at the displayed analysis points and groups and may select a particular debug configuration by selecting certain analysis points and/or groups. The analysis points and analysis groups can be shown at different levels of detail such as for example a module level, a sub-module level and a sub-sub-module level as will be explained in more detail later on.

Figure 2:
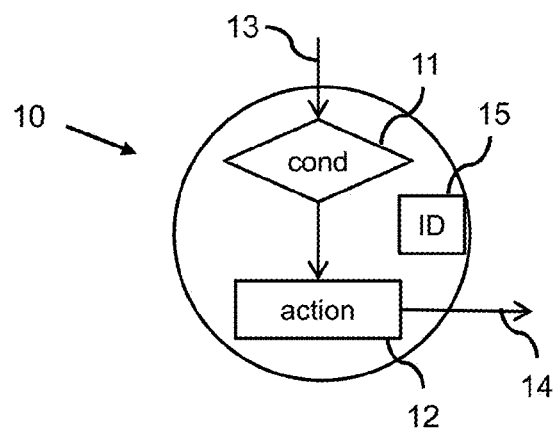
FIG. 2 shows a possible representation of an analysis point.

FIG. 2 shows a possible graphical representation of an analysis point 10. The analysis point 10 may comprises a condition 11 and an action 12. The analysis point 10 may also comprise an input 13 and an output 14. Furthermore, the analysis point 10 may comprise a label 15 indicating an ID of an on-chip component to be configured. FIG. 2 may also represent an analysis group. An analysis group is defined as a set of analysis points that together contribute to the full definition/configuration/setting of the debug feature set of the SoC module or sub-module to which the named analysis group is associated.

Figure 3A:
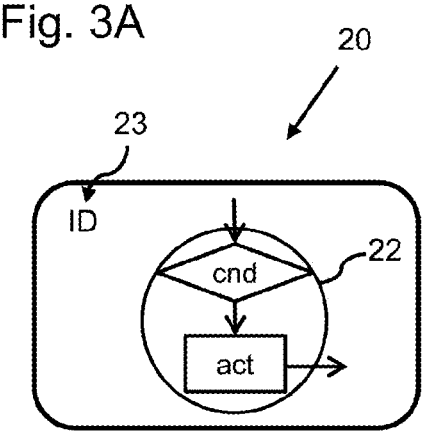
FIG. 3A shows an example of an analysis group at the so-called module level.

FIG. 3A shows an example of representation of a module 20 (e.g. a Frame Manager) and an associated analysis group 22 at the module level. At the module level the module 20 is depicted as a rounded rectangular surrounding a representation of the analysis group 22. The module 20 may comprise a label 23 indicating an ID of the module 20.

Figure 3B:
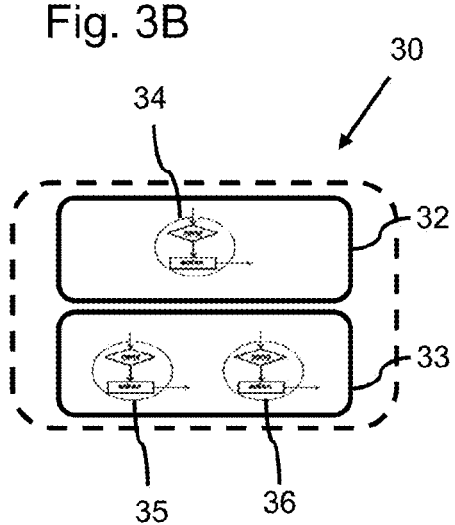
FIG. 3B shows an example of corresponding analysis groups at a lower level.

FIG. 3B shows an example of a module 30 at the sub-module level. At the sub-module level, the module 30 is indicated by a rounded dashed rectangular surrounding one or more sub-modules 32, 33. The sub-modules 32, 33 may comprise one or more analysis points or analysis groups as shown in FIG. 3, see 34, 35, 36. For clarity reasons, possible labels for indicating IDs of the different groups and/or component are left out in FIG. 3B. The module 30 shown in FIG. 3B may correspond to the module 20 in FIG. 3A. In that case, the analysis points 34, 35, 36 relate to the analysis group 22. In this way, a user may view a specific module and the associated analysis groups and/or points on different levels of detail. In the following description the word 'analysis point' is used when discussing the lowest (i.e. most detailed) level. At the higher abstraction levels (i.e. GUI layers), the word 'analysis group' is used.

Analysis points may be connected to each other by the user using the GUI. Alternatively, connections between analysis points may be predefined in a database as will be explained below in more detail. Also analysis groups may be connected to each other or an analysis point may be connected to an analysis group.

Figure 4:
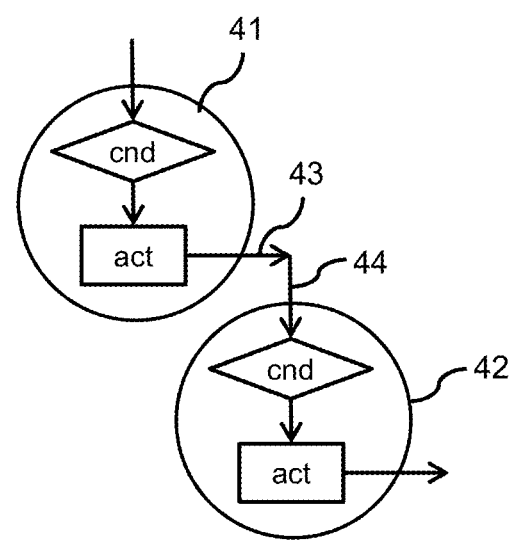
FIG. 4 shows an example of two connected analysis points according to an embodiment.

FIG. 4 shows an example of two connected analysis points 41 and 42. As can be seen from FIG. 4, an output 43 of analysis point 41 is connected to an input 44 of analysis point 42. In this way a result of the action of analysis point 41 is affecting the outcome of the condition of analysis point 42. This is graphically represented by unidirectional arrows. Sets of analysis points and/or groups linked together by dependency relations are referred to as analysis chains.

As discussed above the analysis points are organized using analysis point groups, or simply analysis groups. Similar to analysis points, an analysis group can be used to configure a condition and an action. Such a group condition and group action apply to all the analysis points in the analysis group. Each analysis point group is graphically represented similar to the analysis points. A detailed view of the analysis points group shows the contained analysis points at sub-module level. The analysis points and groups can be linked by dependency relation, resulting in analysis chains.

Figure 5:
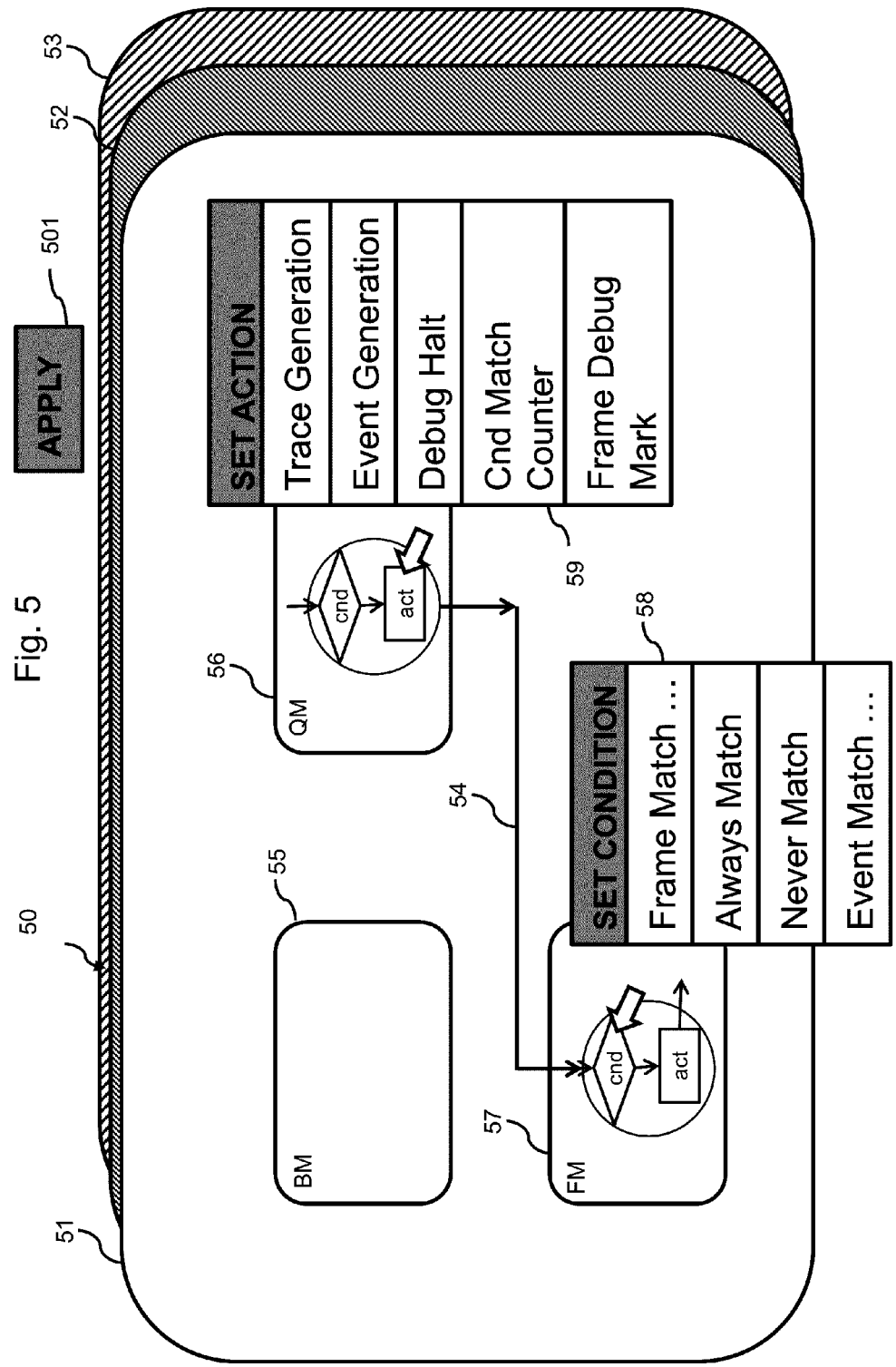
FIG. 5 shows an example of a top layer of a configuration GUI according to an embodiment.

FIG. 5 shows an example of a top layer 51 of a configuration GUI 50 according to an embodiment. In FIG. 5 a sub-module level 52 and a sub-sub-module level 53 are just partly shown in order to visualize the layered structure of the GUI 50. At the module level 51 three modules 55, 56, 57 are shown in this example. The module 55 represents a Buffer manager BM, the module 56 represents a Queue manager QM with one associated analysis group and the module 57 represents a Frame manager FM with one associated analysis group. The user can set the condition and/or action of each analysis group. This may be done by e.g. clicking on the condition icon or action icon within an analysis group using a computer mouse or any other known user interface. Once the user clicks on the condition icon of the analysis group in module 57, a pop-up menu 58 may appear showing a list of possible instructions to set a condition for the FM debug features. Similarly the user may select the condition icon of the analysis group in module 56, and a pop-up menu 59 may appear showing a list of possible instructions to set an action for the QM. As can be seen from FIG. 5, several different actions may be set. In the example of FIG. 5 the following options can be selected:

Trace generation; this option can be selected to switch a trace generation between an ON and OFF mode. In the ON mode the SoC module (e.g. Queue Manager) is configured to write in a memory buffer or on a bus a log of its activity (e.g. the QM will log the timestamp and the type of action such as frame enqueue or frame dequeue);

Event generation; when selecting this option, a drop-down list may appear showing several named event signals (e.g. EVT_1, EVT_2) from which the user can select those that will be asserted when the analysis point condition is true;

Debug halt; this option can be used to switch between an ON and OFF mode. In the ON mode e.g. a core or an accelerator is halted for investigation of the analysis point if the condition is true;

CndMatch Counter; this option can be selected to switch between an ON and OFF mode, wherein in the ON mode the number of condition match events is counted. This may be used to create a profile in time of specific network traffic (e.g. TCP from IP 10.20.30.40);

Frame Debug Mark; when selecting this option a drop-down list of valid values may pop-up to enable the user to mark a certain frame for debug (e.g. select from values {1, 2, 3} to mark a frame for debug, i.e. set the debug mark field of a frame descriptor to the selected value).

The frames will be selected based to the Condition settings. By using the three different values {1, 2, 3} three debug flows can be marked simultaneously, e.g. debug flow marked with 1 corresponds to TCP frames from IP 10.20.30.40, debug flow marked with 2 to all UDP frames, debug flow marked with 3 corresponds to TCP from IP 11.21.31.41. An advantage of configuring the debug features in this way is that the user does not need to know the target debug registers to write specific values that need to be looked up in the SoC debug documentation.

As can be seen from the pop up menu 58 in FIG. 5, several different conditions may be set. In the example of FIG. 5 the following options can be selected:

Frame match: when selecting this option a further popup menu may appear to select certain frame matching criteria for a frame; one of the frame matching criteria may be the networking protocol and in that case a further drop-down list may appear for selecting e.g. IP, TCP, UDP, or SSL. For each protocol criterion a set of fields (i.e. network packet structure fields) specific to that protocol may be selected for more exact filtering. A frame debug mark value can also be a frame matching criterion (e.g. the user selects from valid debug mark values {1, 2, 3} so that the analysis point condition matches when the frame that is processed by the functional block has the debug mark field set to user selected value)

Always Match: option to select ON/OFF mode (e.g. if ON, the analysis point condition will always be true for this analysis point so the associated action will always take place)

Never Match: option to select ON/OFF mode (e.g. if ON, the analysis point condition will always be false for this analysis point so the action will never take place; this setting is the most appropriate as the default setting at the start-up of the debugging tool)

Event Match: when selecting this option a drop-down list may appear with named event signals (e.g. EVT_1, EVT_2) from which the user can select one that, if asserted, makes the analysis point condition be true.

FIG. 5 also shows a button 501 which can be clicked by the user to apply the selected setting as will be explained below in more detail.

The pop up menu 58 in FIG. 5 is just an example showing possible condition settings for a frame manager at the module level. It should be clear to the skilled person that other condition settings are possible for other modules.

A condition of an analysis point or an analysis group may be determined by the content (command or status) of a SoC module register. It should be understood here that a user does not need to interact with the debugger registers themselves thanks to the GUI and API. The debug registers are known by the tool and the tool is able to translate GUI settings to content of debug registers.

Alternatively, the condition may be determined by the data processed at that module, e.g. it may depend on the debug mark field of the network frame descriptor. The analysis point condition may as well be determined by cross-triggered events.

As was mentioned above, an action of an analysis point or an analysis group may be the generation of a cross trigger, also referred to as cross-trigger event generation. An action may alternatively be an update of the content of the data processed by that SoC module (e.g. writing a specific value in the debug mark field in the network frame descriptor).

An action may also be the generation of a trace, referred to as trace generation. An action may also be the generation of an event signal, referred to as event signal generation. Furthermore the action can be the stopping of the module execution (see Debug halt option in FIG. 5) to allow deep inspection of the module status.

The user may create a cross-trigger between the analysis group in the QM module 56 and the analysis group in the FM module 57. For example, the user may click on the action icon of the analysis group in the QM module 56 and select 'Event generation'. He may chose e.g. 'event signal EVT_1' from a selection list (not shown) and then turn to the analysis group in the FM module 57. At the analysis group in the FM module 57, the user can click on the condition icon and select the event match item in pop-up 58 and select 'signal EVT_1' as the matching criterion. Once the user has entered these options, the GUI 50 will be updated and a connection 54 is shown between the analysis group in the QM module 56 and the analysis group in the FM module 57.

Another way of creating relations between two analysis points or groups is achieved for instance by marking certain frames for debug. In the Queue Manager group 56 an action may be to mark for debug the processed frame with value 2. In the Frame Manager group 57 the condition may then be frame match, based on the debug mark criterion and the same value 2 being selected as the debug mark value.

Figure 6:
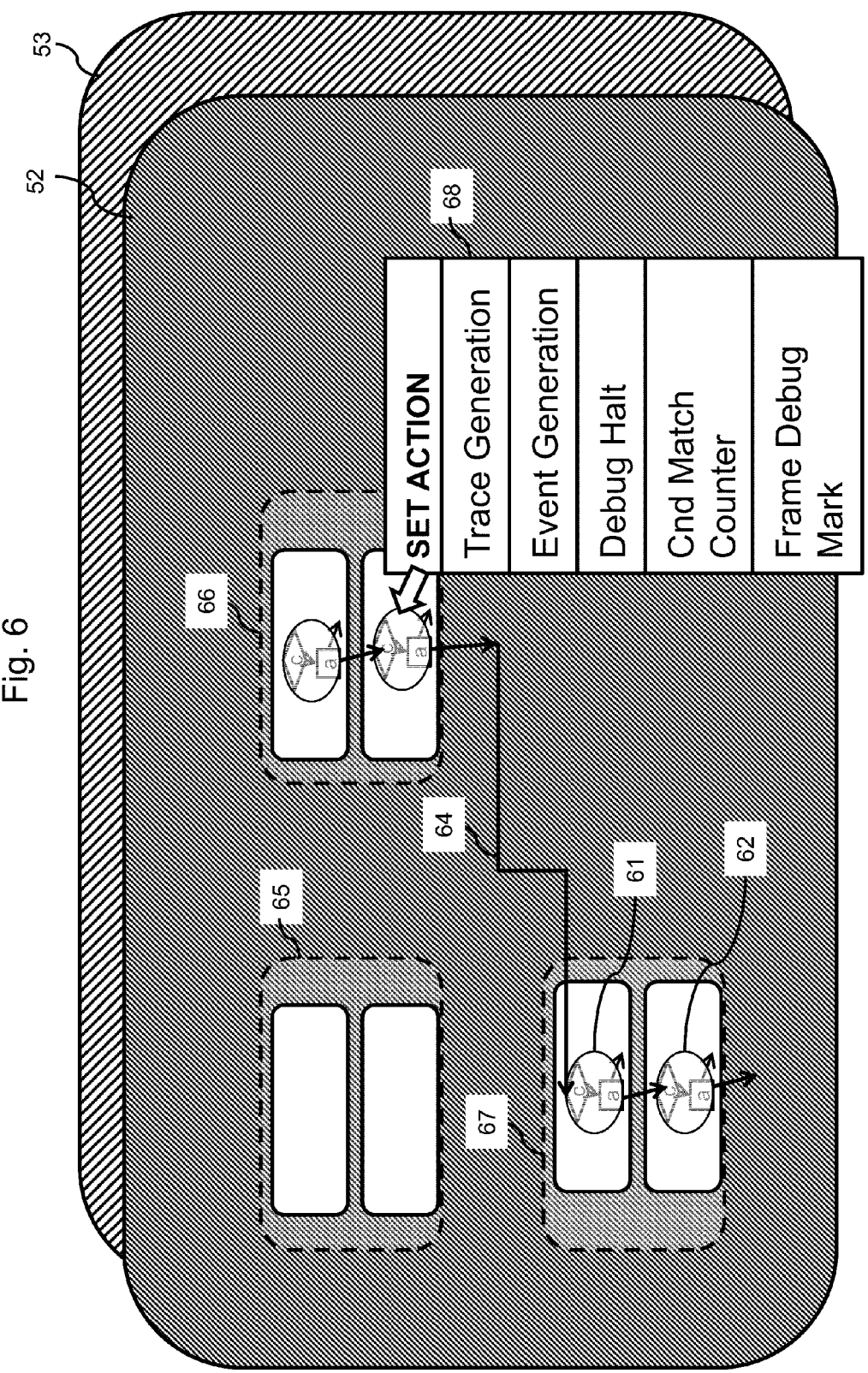
FIG. 6 shows the GUI of FIG. 5 with the sub-module layer brought to the front.

The user may click on the second layer (i.e. sub-module layer 52) to bring that layer to the front. FIG. 6 shows an example of a medium layer of the configuration GUI according to an embodiment. FIG. 6 shows the GUI 50 of FIG. 5 with the sub-module layer 52 brought to the front, so as to show the analysis points view at the sub-modules level. As can be seen from FIG. 6, three modules 65, 66, 67 are shown corresponding to the modules 55, 56 and 57 on the module level. In this example, each of the modules 65, 66, 67 comprise two sub-modules each of these is represented by a rounded rectangular surrounding a picture of an analysis point/group. FIG. 6 also shows a cross triggering connection 64 between an analysis group in module 66 and one in module 67 which reflects the connection 54 created at the module level when viewing layer 51, see FIG. 5. The end-points of connection 64 are linked to those analysis groups in the sub-modules 66, 67 as determined by a hierarchical API implementation—info at upper levels is propagated top-down to lower levels. The analysis group 61 can e.g. represent a Frame Manager BMI and the analysis group 62 can represent a Frame manager parser. A connection between the two may exist if the Frame Manager BMI marks frames for debug and the Frame Manager Parser matches those same debug frames, as was described above.

At the sub-module level view shown in FIG. 6 the user can define analysis point conditions and actions for groups of block sub-components, like DPAA sub-components. The medium level also allows the user to define and use convenient abstractions to improve usability of the interface.

Figure 7:
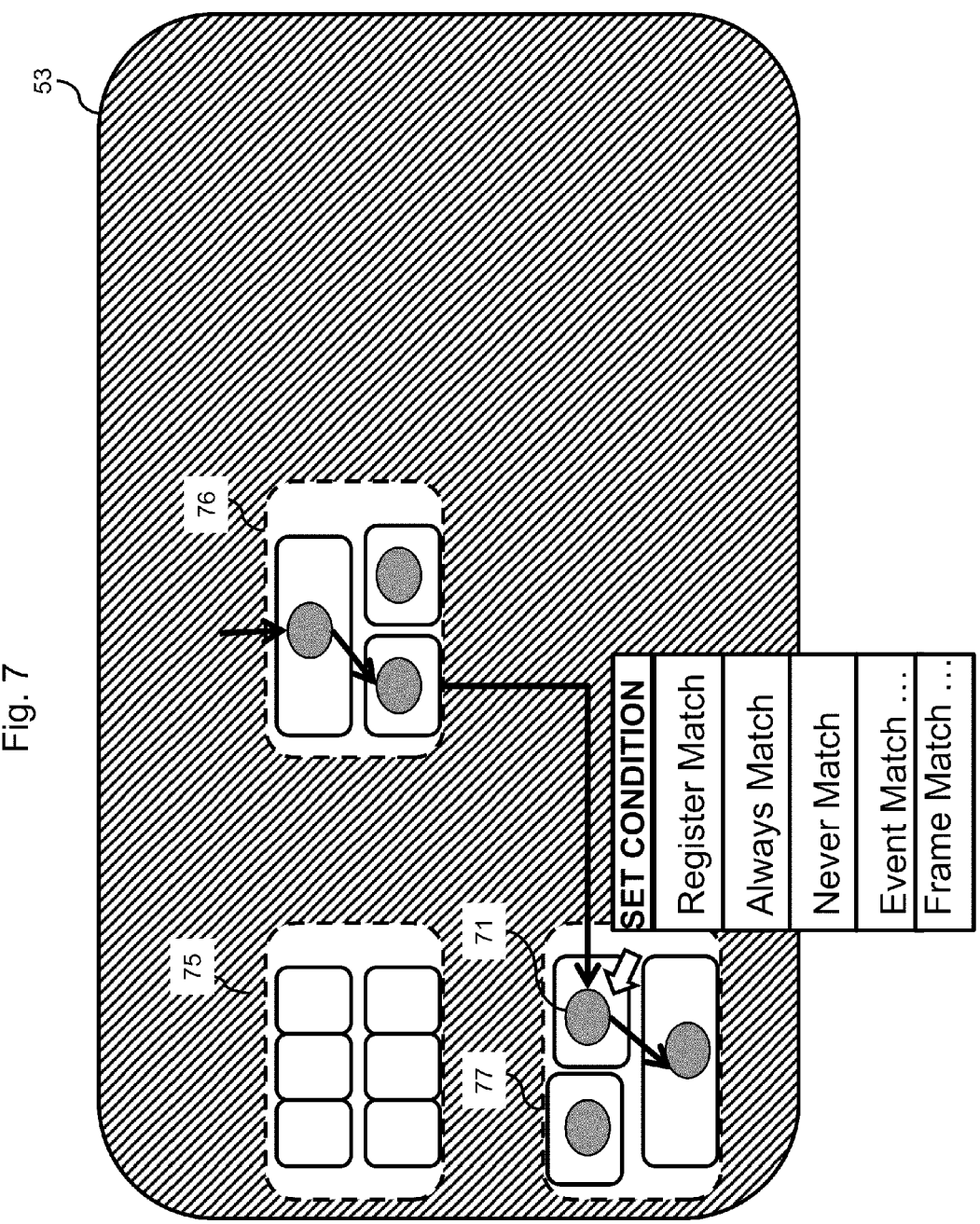
FIG. 7 shows the sub-sub-module level of the GUI of FIG. 5.

FIG. 7 shows the sub-sub-module level 53 of the GUI 50 of FIG. 5. As can be seen from FIG. 7 three rounded rectangular shapes 75, 76, 77 are shown representing the Buffer manager, the Queue manager and the Frame manager, respectively.

In FIG. 7 the modules 75, 76 and 77 each contain multiple sub-modules which contain an oval representing an analysis point. For a core on oval may represent a "traditional" breakpoint and for the DPAA it may represent a debug flow. A debug flow is a collection of properties that are used to identify frame flows of interest for the purposes of debugging or performance monitoring. Depending on the implementation, the DPAA may support one or multiple debug flows, which might be labelled 1, 2, 3, and so on.

The user may select one of the ovals to set a condition for an analysis point like for example:

For a core: to set a breakpoint, the user inputs a value to be matched with the program counter register (this can be done with "Register match" menu item), For the DPAA module: a Frame Manager BMI analysis point associated with a debug flow can be controlled. By setting for example in "Frame match" the condition that the frame length should be 128 (0x80) bytes the user will be able to configure the FM debug flow 1 to be defined by frames matching the frame length criterion, For the DPAA module: a Frame Manager Keygen analysis point associated to a debug flow can be controlled. By setting for example in "Frame match" the condition that the frames distributed on frame queue FQID=0xA0B0, the user will be able to configure the debug flow 2 by frames matching the frame queue criterion. This is an example of criterion very specific to the sub-module. In such cases it does not make sense to expose the same criterion at a higher level in the hierarchy, so the lower level complements the settings applied at higher levels to cover the whole debug feature set of the SoC.

Figure 8:
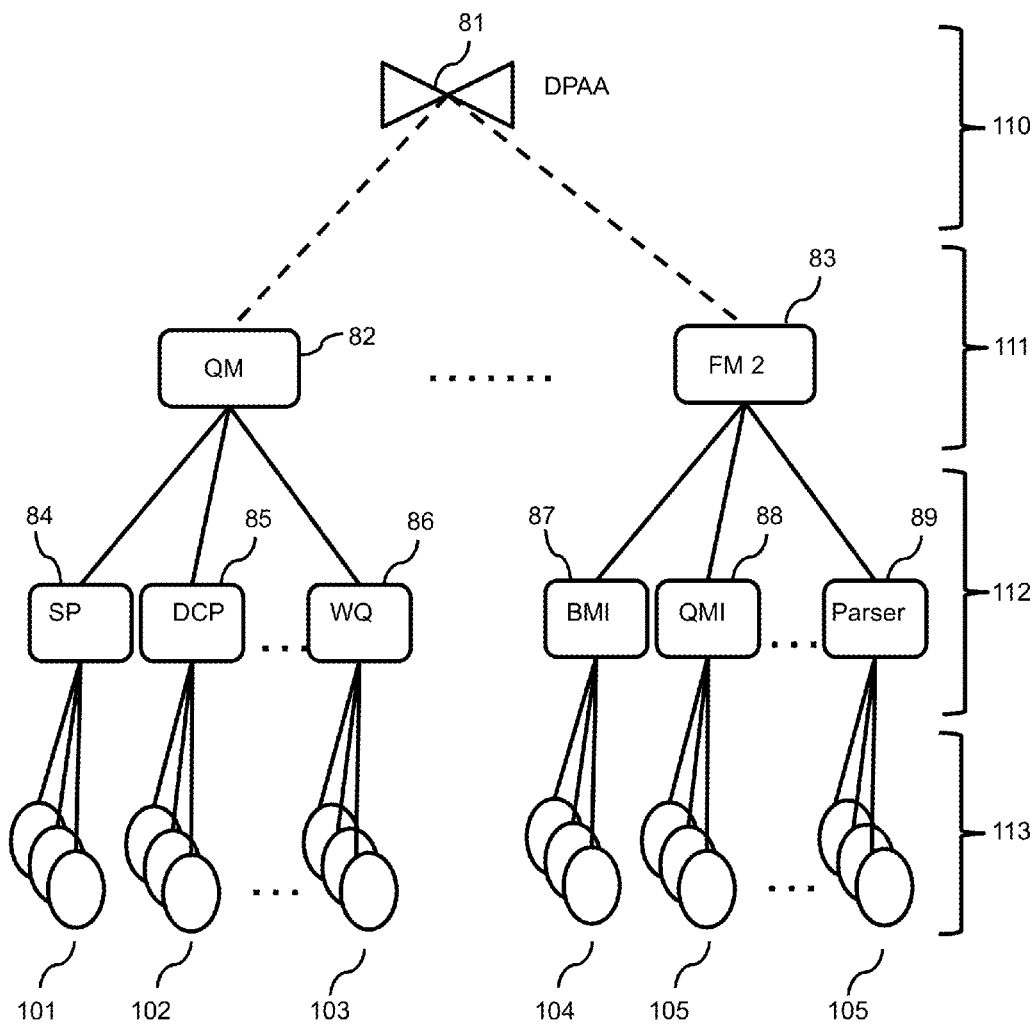
FIG. 8 shows the DPAA Analysis point hierarchy that can be used as support for a Layered GUI for debug configuration.

FIG. 8 shows the DPAA Analysis point hierarchy that can be used when structuring the analysis points/groups in the layered GUI for debug configuration of the DPAA module. At a top level 110 the DPAA module 81 itself is depicted. It is noted that the top level 110 was not displayed by a layer of the GUI 50 of FIG. 5. At such top level layer the user could define the analysis point condition and action for block components such as the DPAA 1, a cores complex (see the eight cores 8 in FIG. 1 marked with "Power Architecture e500-mc Core") or a system interconnect module (see "CoreNet" in FIG. 1). An example for a condition for the DPAA 1 at this level is: match ingress frames with user defined 5-tuple i.e. (src addr, dst addr, src port, dst port, protocol). An example for an action for the core complex 8 at this level is: "halt all cores".

At a first module level 111, the DPAA sub-components can be configured. Examples of DPAA sub-components configurable at this level are: a Queue Manager 82, a Frame Manager 83, a Buffer Manager (not shown) and a Security Engine (not shown in FIG. 8).

Examples of cores complex sub-components configurable at this level are: the set of DSP cores and the set of control cores.

A condition example for DPAA at this level is: match frames received on network interfaces of Frame Manager 2. A condition example for the core complex 8 at this level is: the cache miss rate for the DSP cores set is >35%. An action example for the core complex 8 at this level is: start data trace on all DSP cores.

At a second module level 112 analysis points may be associated with Frame Manager engines such as a Buffer Manager Interface (BMI) 87, a Queue Manager Interface (QMI) 88, a BMI Parser 89, a Policer, a Classifier or a key generator (Keygen) (last three not shown). Other analysis points could be associated to so-called frame enqueue/dequeue points in the Queue Manager from and to Software Portals or accelerator portals (e.g. the portals of the Security Engine 5 or Pattern Matching Engine 6).

A condition example for a DPAA module at the level 112 is: set Frame Manager Keygen engine to match frames distributed on frame queue FQID=0xA0B0. Examples of cores complex sub-components configurable at the level 112 are individual cores and caches. An action example for the core complex 8 at this level is: start a data trace on all DSP cores.

At a register level 113 analysis points may be associated with lower level entities such as debug flows for the DPAA module 1—like was discussed with reference to FIG. 7. The register level is used for fine-grained debug IP control. The user will use this layer when he needs/wants to access full debug capability of the SoC and if that is not provided by the higher layers. Levels 110-111 may be used at the beginning of an investigation. Non-expert users will likely prefer using these levels. The levels 112-113 are useful to narrow down the investigation. Expert users may prefer level 113 for fine-grained control.

Figure 9:
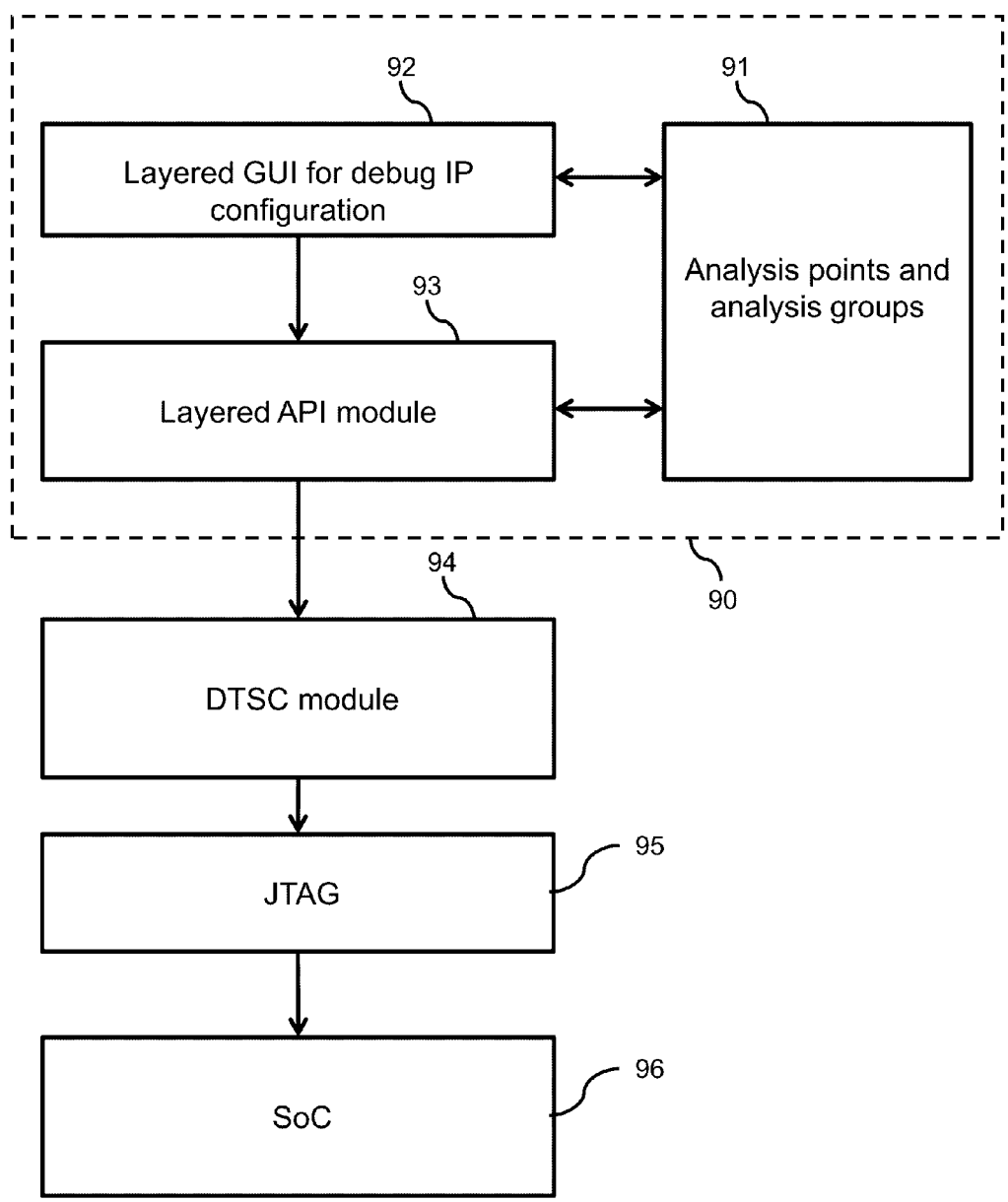
FIG. 9 shows an overview of a debug configuration system comprising a layered GUI for system debug configuration according to an embodiment.

FIG. 9 shows an overview of an example of a debug configuration system 90 (also referred to as debug configuration tool) comprising a database 91 and a GUI module 92 for debug IP configuration. The system 90 also comprises an application programming interface (API) module 93 for configuration of the analysis points and groups.

FIG. 9 also shows a debug target system configuration (DTSC) module 94 which is arranged to interact with debug registers 95 of a target system, such as the DPAA module 1 described above. The debug target system configuration module 94 is known as such and will not be described in detail. It communicates the configuration settings via a JTAG 95 to the IP registers on the SoC 96.

The database 91 comprises a plurality of predefined analysis points. Each of the analysis points relates to a configurable chip entity, and comprises a configurable condition and a configurable action for the chip entity. Furthermore the database 91 comprise a plurality of predefined analysis groups. Each of the analysis groups relates to a group of configurable chip entities, and comprises a configurable condition and a configurable action for the group of chip entities.

The graphical user interface module is arranged to display representations of at least some of the analysis points and the analysis groups on different levels of detail, and to receive input from a user to set the configurable conditions and/or actions for the displayed analysis points and the analysis groups.

The application program interface module 93 is arranged to process data received from the graphical user interface module 92 to obtain debug settings and to communicate the debug settings to the debug target system configuration module 94.

The graphical user interface 92 may be arranged to process inputs from the user such as the user selecting an item from a displayed menu and/or dropdown list box as was explained above.

In an embodiment the graphical user interface module 92 is arranged to display the representations of the analysis points and/or analysis groups on different graphical layers 51, 52, 53 reflecting the levels of detail. Each of the analysis groups may relate to a chip module and may be associated with one or more analysis points that relate to sub-modules of the chip module.

In an embodiment the graphical user interface module 92 is arranged to receive input from the user to define a cross triggering event between the analysis points and/or the analysis groups. To this end the graphical user interface module 92 may be arranged to set a specified action of a first analysis point and set a specified condition of a second analysis point, the specified condition being dependent on the specified action, as was described above with reference to FIG. 5.

In an embodiment, the application program interface module 93 is arranged to set a condition for an analysis group related to a chip module, to obtain a condition setting. The condition setting is propagated the top-down to analysis groups and or analysis points of lower leveled sub-modules of the chip module. In this way the user can set condition on a high level for many sub-modules at once.

The debug configuration tool as described above may comprise a set of API functions containing subsets of API functions for each of the different levels of detail.

In an embodiment the application program interface module 93 comprises an API function that sets a module condition for an analysis group at a module level for a frame manager of a Data Path Acceleration Architecture block. The module condition may be defined by the matching of those frames conforming to a 3-tuple criteria, the 3-tuple comprising a protocol type, a source address and destination address of a frame.

To further explain the functioning of the above embodiments, an example is discussed now.

Using the GUI as in FIG. 5, the user selects condition "Always match" (in popup menu 58) for the FM module 57. This functionality is implemented by the GUI software 92 in FIG. 9. Once the user has selected a condition, the functionality in the API module 93 is called via an API call that sets a condition for the analysis group associated to the FM module 57, in this case "Always match" condition. Functionality in the API module 93 propagates the condition setting top-down to analysis groups associated to FM sub-modules (FM BMI, FM Parser, FM KeyGen . . . ). In this case, basically, the condition of each of these analysis groups will also be set as "Always match". Then, functionality in the API module 93 further propagates top-down the "Always match" condition of the analysis groups associated to the FM BMI, the FM Parser, the FM Keygen until the analysis points at the lowest level related to e.g. the FM debug flows labeled 1, 2 and 3.

Once the user finished the configuration of the conditions and/or actions, he may push the Apply button 501, so that the API module 93 generates a debug configuration (being the set of 2-tuples of type (debug register name, value)) based on the conditions and actions for the analysis points at the lowest level in the hierarchy. For instance, in this case, the FM bits 1 to 3 in the debug registers of type "Rx Debug Configuration Register (FMBM_RDCFG)" will get value b001 representing "Always match (referred to as trap bypass)". Note that there may be 30 such registers (3 debug flows×10 receive network port).

Then the DTSC module 94 is activated: it receives as input the debug configuration as a set of 2-tuples of type (debug register name, value) from the module 93. The DTSC module 94 connects to the SoC 96 via the debug adapter 95 (such as a JTAG)) and writes each target debug register with the value associated to the corresponding register in the set of 2-tuples. Once the DTSC module 94 finishes writing the target debug registers, the SoC device is configured as desired by the user. The debugger tool is connected to the device. The user starts the application to be debugged or analyzed for performance optimization processes. Now the debug actions (debug halt, trace generation or event signaling) will take place as configured by the user via the layered GUI.

The next steps in the debugging process may depend on the type of actions selected:

In case of debug halt, the SoC modules stop execution and the user may proceed to deep investigation using the debugger tool (as in any "traditional" procedure to display the content of the registers or memory using a debugger tool)

In case of trace generation, the SoC modules start writing activity log messages in a SoC memory buffer (the messages may be formatted in a standard way such as Nexus IEEE-ISTO 5001™); the performance analysis tool reads and decodes those messages and then displays the decoded content for the user (similar to the traditional procedures to display the decoded trace data in a performance analysis tool)

So there is provided a generic analysis point as central concept and graphical element for system analysis tool user interfaces with improved usability, high scalability and reusability for multiple SoC designs. The described debug configuration tool hides the complexity of the debugged system, to allow for easy use of the tool. The debug configuration tool may support configurations of hundreds or even thousands of debug settings. The configuration debug tool's interface uses an abstract model design, which makes it easy for the user to use the same set of tools for different SoC designs. The layered graphical user interface provides a representation of generic analysis point's inter-dependencies. It provides a representation of generic analysis point groups. The layered graphical user interface provides a set of system view representations with increasingly detailed analysis configuration controls for each SoC sub-system using unified terminology and representation across all system view layers.

The proposed debug configuration tool can be useful in many situations, for example:

1) On a SoC with 2 DDR blocks the memory latency is unexpectedly high for a test application; the proposed debug configuration tool will allow to configure DDR to generate trace generation when high rates of memory accesses occur using a configuration with cross-triggering from cores to DDR blocks. The DDR trace may reveal one of the DDR blocks was not enabled.

2) On a SoC with 4 accelerators and 2 processing cores, the cores send chunks of data to be processed by accelerators. When reading back the data on cores, some of the data is corrupted for an unknown reason. The proposed debug configuration tool will allow to configure the accelerators to halt when the core sends a specific data chunk to the accelerators. Deep investigation of the accelerator status may reveal that incorrect data offset was passed by the cores.

Figure 10:
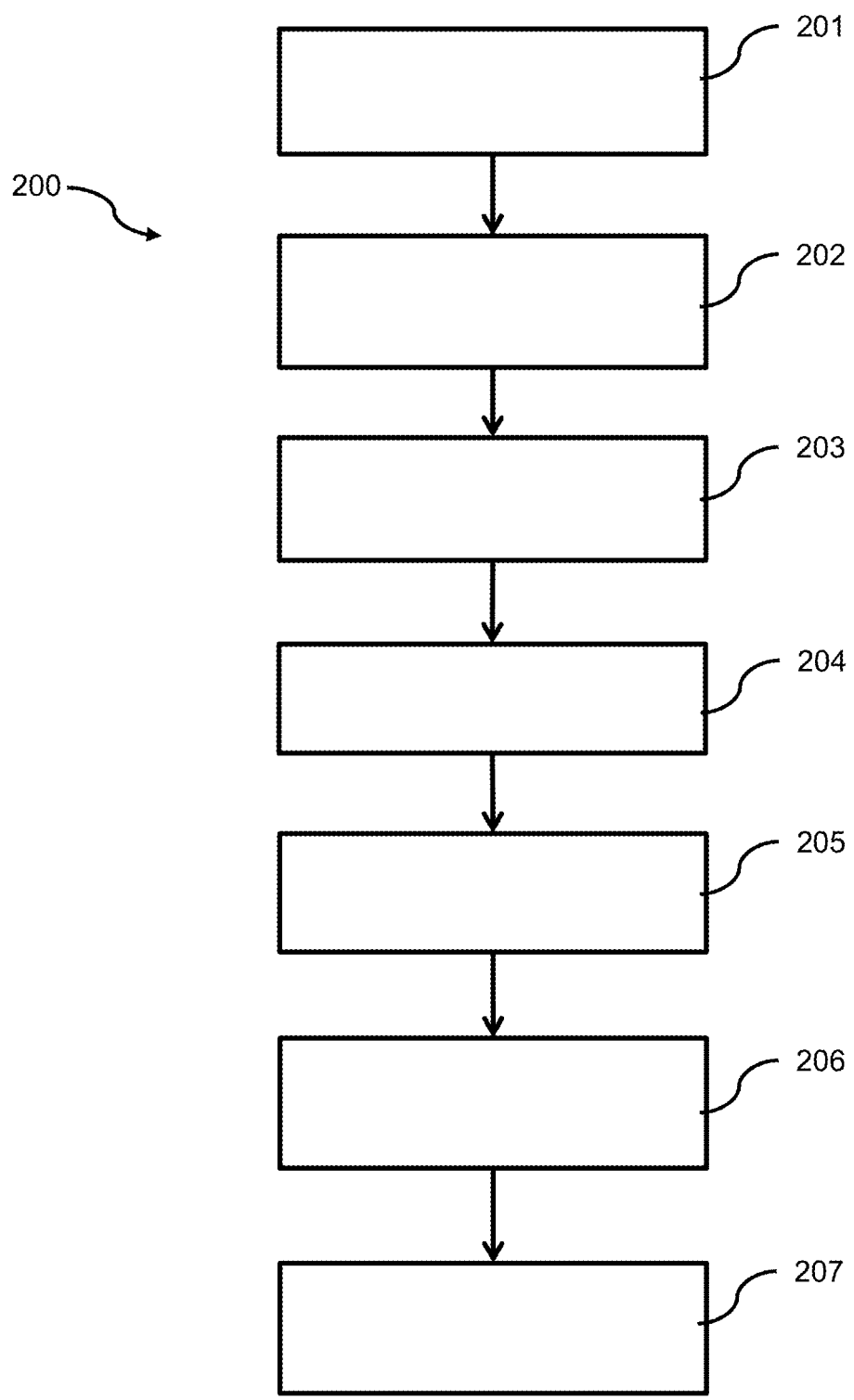
FIG. 10 shows a flow chart of a method 200 for configuration of on-chip debug features according to an embodiment.

FIG. 10 shows a flow chart of a method 200 for configuration of on-chip debug features according to an embodiment. The method 200 comprises defining 201 analysis points, each of the analysis points relating to a configurable chip entity, and comprising a configurable condition and a configurable action for the chip entity. A next action of the method 200 is defining 202 analysis groups, each of the analysis groups relating to a group of configurable chip entities, and comprising a configurable condition and a configurable action for the group of chip entities. A further action is the storing 203 of the predefined analysis points and predefined analysis groups. An next the displaying 204, by means of a graphical user interface, of representations of at least some of the analysis points and the analysis groups on different levels of detail. Which is followed by the receiving 205, by means of the graphical user interface, of input from a user to set the configurable conditions and/or actions for the displayed analysis points and the analysis groups. Next, the processing 206 of data received from the graphical user interface module is performed to obtain debug settings and them at an action 207, the debug settings are communicated to a debug target system configuration module.

In an embodiment the method comprises the setting a condition for an analysis group related to a chip module, to obtain a condition setting, and the propagating the condition setting top-down to analysis groups and or analysis points of lower leveled sub-modules of the chip module.

Figure 11:
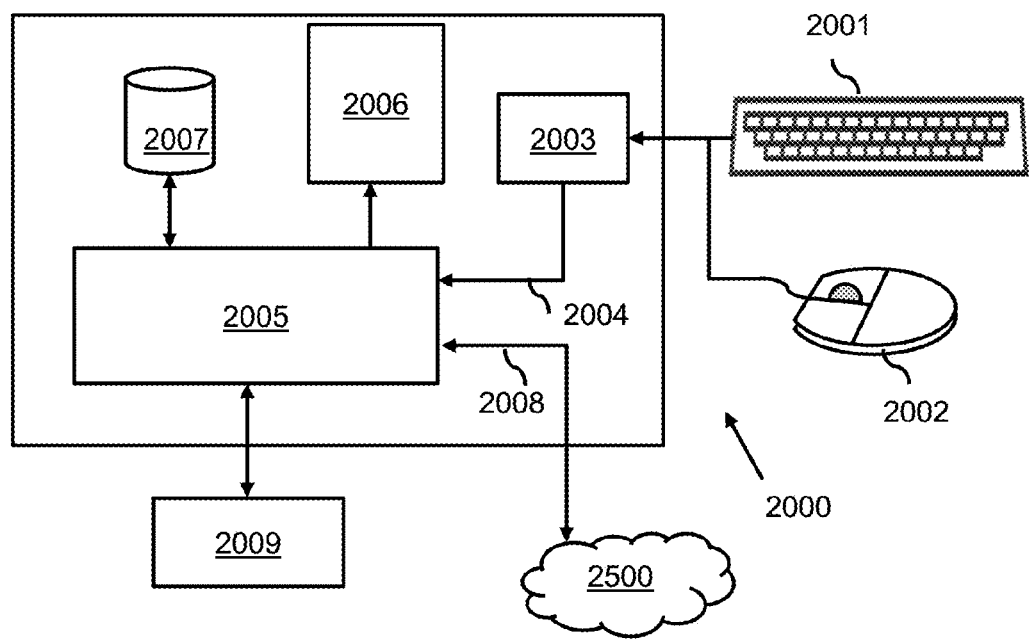
FIG. 11 schematically shows an exemplary user interaction system.

FIG. 11 schematically shows an exemplary user interaction system 2000 having a programmable processor 2005. The user interaction system 2000 is shown to be a personal computer, but may be any type of suitable user interaction system 2000. The programmable processor may comprise one or more components of the debug configuration system 90. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present the graphical user interface on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as the database 91. The user interaction system 2000 may further comprise a communication channel 2008 allowing the processor 2005 to connect to an external cloud 2500 for communicating with other devices in the cloud. The external cloud may e.g. be the Internet. The processor 2005 may also be arranged to retrieve information determined during further executions of the described method from the storage unit 2007, or from another device in the cloud 2500, and generate a report by the processor 2005. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform the method as described above.

Figure 12:
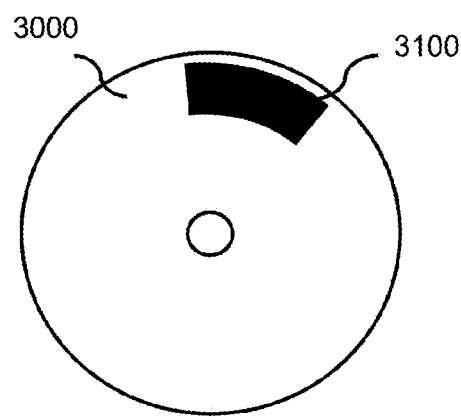
FIG. 12 shows a computer readable medium comprising a computer program product according to an embodiment.

FIG. 12 shows a computer readable medium 3000 comprising a computer program product 3100, the computer program product 3100 comprising instructions for causing a processor apparatus to perform the debug configuration method as described above. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 12 as an optical disc, the computer readable medium 3000 may be any suitable computer readable medium, such as a hard disk, solid state memory, flash memory, etc., and may be non-recordable or recordable.

An operating system (OS) is the software that manages the sharing of the resources of a computer and provides programmers with an interface used to access those resources. An operating system processes system data and user input, and responds by allocating and managing tasks and internal system resources as a service to users and programs of the system.

In the foregoing specification, the invention has been described with reference to specific examples of embodiments of the invention. It will, however, be evident that various modifications and changes may be made therein without departing from the broader spirit and scope of the invention as set forth in the appended claims.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A debug configuration tool embodied on a non-transitory machine-readable storage medium on a computer for configuration of on-chip debug features of a system-on-a-chip (SoC), the debug configuration tool comprising:
   a database comprising:
      a plurality of predefined analysis points, each of the analysis points relating to a configurable chip entity, and comprising a configurable condition and a configurable action for the chip entity;
      a plurality of predefined analysis groups, each of the analysis groups relating to a group of configurable chip entities, and comprising a configurable condition and a configurable action for the group of chip entities;
   a graphical user interface module arranged to:
      display representations of at least some of the analysis points and the analysis groups on different levels of detail;
      receive input from a user to set the configurable conditions and/or actions for the displayed analysis points and the analysis groups;
   an application program interface module arranged to process data received from the graphical user interface module to obtain debug settings and to communicate the debug settings to a debug target system configuration module.

2. The debug configuration tool according to claim 1, wherein the graphical user interface module is arranged to display the representations of the analysis points and/or analysis groups on different graphical layers reflecting the levels of detail.

3. The debug configuration tool according to claim 2, wherein each of the analysis groups relates to a chip module and is associated with one or more analysis points that relate to sub-modules of the chip module.

4. The debug configuration tool according claim 3, wherein the graphical user interface module is arranged to receive input from the user to define a cross triggering event between the analysis points and/or the analysis groups.

5. The debug configuration tool according to claim 4, wherein the graphical user interface module is arranged to set a specified action of a first analysis point and set a specified condition of a second analysis point, the specified condition being dependent on the specified action.

6. The debug configuration tool according to claim 5, wherein the application program interface module is arranged to:
set a condition for an analysis group related to a chip module, to obtain a condition setting;
propagate the condition setting top-down to analysis groups and or analysis points of lower level sub-modules of the chip module.

7. The debug configuration tool according to claim 6, wherein the application program interface module comprises a set of API functions containing subsets of API functions for each of the different levels of detail.

8. The debug configuration tool according to claim 7, wherein the application program interface module comprises an API function that sets a module condition for an analysis group at a module level for a frame manager of a Data Path Acceleration Architecture block, the module condition being defined by the matching of those frames conforming to a 3-tuple criteria, the 3-tuple comprising a protocol type, a source address and destination address of a frame.

9. The debug configuration tool according to claim 1, wherein each of the analysis groups relates to a chip module and is associated with one or more analysis points that relate to sub-modules of the chip module.

10. The debug configuration tool according claim 1, wherein the graphical user interface module is arranged to receive input from the user to define a cross triggering event between the analysis points and/or the analysis groups.

11. The debug configuration tool according to claim 1, wherein the application program interface module is arranged to:
set a condition for an analysis group related to a chip module, to obtain a condition setting;
propagate the condition setting top-down to analysis groups and or analysis points of lower level sub-modules of the chip module.

12. The debug configuration tool according to claim 1, wherein the application program interface module comprises a set of API functions containing subsets of API functions for each of the different levels of detail.

13. A method for configuration of on-chip debug features, the method comprising:
defining analysis points, each of the analysis points relating to a configurable chip entity, and comprising a configurable condition and a configurable action for the chip entity;
defining analysis groups, each of the analysis groups relating to a group of configurable chip entities, and comprising a configurable condition and a configurable action for the group of chip entities;
storing the predefined analysis points and predefined analysis groups;
displaying, by means of a graphical user interface, representations of at least some of the analysis points and the analysis groups on different levels of detail;
receiving, by means of the graphical user interface, input from a user to set the configurable conditions and/or actions for the displayed analysis points and the analysis groups;
processing data received from the graphical user interface module to obtain debug settings and
communicating the debug settings to a debug target system configuration module.

14. The method according to claim 13, wherein the representations of the analysis points and/or analysis groups are displayed on different graphical layers reflecting the levels of detail.

15. The method according to claim 14, wherein each of the analysis groups relates to a chip module and is associated with one or more analysis points that relate to sub-modules of the chip module.

16. The method according to claim 15, wherein the graphical user interface is arranged to receive input from the user to define a cross triggering event between the analysis points and/or the analysis groups.

17. The method according to claim 16, wherein the graphical user interface is arranged to set a specified action of a first analysis point and set a specified condition of a second analysis point, the specified condition being dependent on the specified action.

18. The method according to claim 17, wherein the method comprises:
setting a condition for an analysis group related to a chip module, to obtain a condition setting;
propagating the condition setting top-down to analysis groups and or analysis points of lower level sub-modules of the chip module.

* * * * *